H. N. CONNOR.
Sash-Cord Fastener.

No. 167,744. Patented Sept. 14, 1875.

Witnesses
S. J. Van Stavoren
Jos. B. Connolly

Inventor
Herbert N. Connor
By Connolly Bros., Attorneys

N. PETERS, PHOTO-LITHOGRAPHER, WASHINGTON, D. C.

UNITED STATES PATENT OFFICE.

HERBERT N. CONNOR, OF PHILADELPHIA, PENNSYLVANIA.

IMPROVEMENT IN SASH-CORD FASTENERS.

Specification forming part of Letters Patent No. 167,744, dated September 14, 1875; application filed July 2, 1875.

*To all whom it may concern:*

Be it known that I, HERBERT N. CONNOR, of Philadelphia, in the county of Philadelphia and State of Pennsylvania, have invented certain new and useful Improvements in Fastening Attachments for Sash-Cords; and I do hereby declare the following to be a full, clear, and exact description of the invention, such as will enable others skilled in the art to which it pertains to make and use it, reference being had to the accompanying drawings, which form part of this specification, in which—

Figure 1:
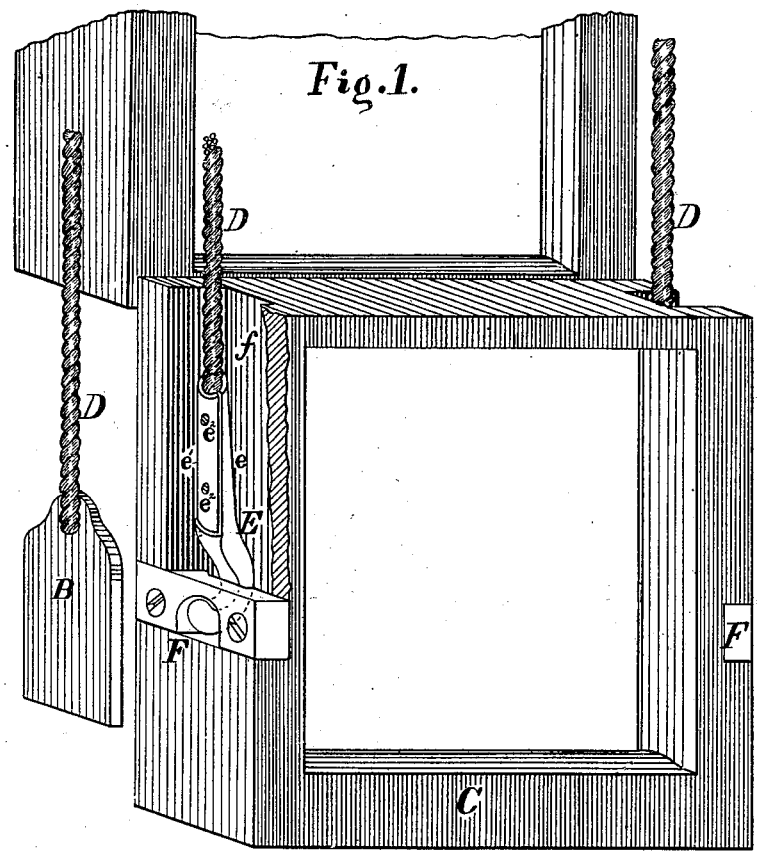
Figure 2:
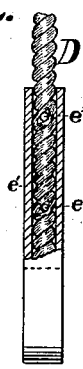
Figure 3:
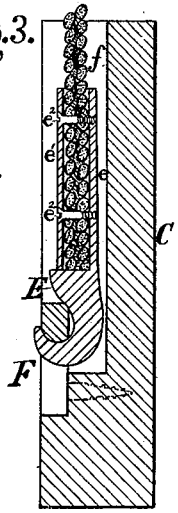
Figure 4:
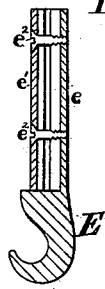

Figure 1 is a perspective of the invention; Figs. 2 and 3, vertical transverse sections; Fig. 4, vertical transverse section.

The object of my invention is to provide a device for attaching or securing the ends of cords to the stiles of window-sashes, to serve as a substitute for the knotting method heretofore generally practiced.

My invention consists of a plate which is fastened in a suitable recess in the stile, and a hook having a segmental shank, in which the end of the cord or rope is fastened, said plate and hook locking with each other, as hereinafter more fully described.

Referring to the accompanying drawing, B represents a weight for counterbalancing the sash C. D is a cord or rope extending from the weight to the sash, passing in the usual manner over a suitable pulley in the frame. E represents a hook, secured to the end of the cord D, the shank of said hook being formed in two sections, $e$ and $e^1$, held together by screws $e^2$ $e^2$, and forming a socket. The cord is secured to the hook by laying the end of the former in the hollow of the section $e$. The section $e^1$ is then placed in position, and the screws $e^2$ inserted, passing through said cord or between its strands, and holding the parts firmly together. The plate is shown at F, being fastened by screws in a lateral recess at the base of the groove $f$, in which the cord usually rests. The back of the plate F is recessed, as shown at $f^1$, and is also notched at $f^2$, so as to keep the hook securely in place.

In order to insert or remove the hook it must first be brought into a horizontal position. When hanging vertically, it can be neither applied nor disengaged from connection with the plate F.

What I claim as my invention is—

The combination, with the vertically and transversely recessed sash C, of the recessed catch-bar F and concavely-channeled hook E, provided with the concavo-convex plate $e$ secured thereto by screws $e^2$ passing through and holding the cord D, substantially as shown and described.

In testimony that I claim the foregoing I have hereunto set my hand this 26th day of June, 1875.

HERBERT N. CONNOR.

Witnesses:
    M. DANL. CONNOLLY,
    CHAS. F. VAN HORN.